United States Patent [19]
Cocchiara et al.

[11] 4,301,651
[45] Nov. 24, 1981

[54] EXHAUST GAS REACTOR
[75] Inventors: Franco Cocchiara; Mario Camarsa, both of Rome; Gian P. Garcea, Milan, all of Italy
[73] Assignees: Exxon Research & Engineering Co., Florham Park, N.J.; Alfa Romeo SpA, Milan, Italy
[21] Appl. No.: 699,618
[22] Filed: Jun. 25, 1976

Related U.S. Application Data
[63] Continuation of Ser. No. 459,588, Apr. 10, 1974, abandoned.

[30] Foreign Application Priority Data
Apr. 11, 1973 [IT] Italy ............................... 49370 A/73

[51] Int. Cl.$^3$ .............................................. F01N 3/26
[52] U.S. Cl. ........................................ 60/282; 60/307; 60/323; 422/168
[58] Field of Search ................. 60/274, 303, 306, 307, 60/282, 323; 23/277 C; 422/168

[56] References Cited
U.S. PATENT DOCUMENTS

| | | | |
|---|---|---|---|
| 2,935,840 | 5/1960 | Schoppe | 60/39.69 |
| 3,577,728 | 5/1971 | Brimer | 60/303 |
| 3,640,072 | 2/1972 | Kayser | 60/265 |
| 3,788,070 | 1/1974 | Camarsa | 60/282 |
| 3,802,194 | 4/1974 | Tanasawa | 60/303 |
| 3,805,523 | 4/1974 | Tanasawa | 60/307 |

Primary Examiner—Douglas Hart
Attorney, Agent, or Firm—F. Donald Paris

[57] ABSTRACT

A reactor for the oxidation of unburned and partially burned components in the exhaust gas from an internal combustion engine comprising a chamber which is substantially circular in cross-sections perpendicular to its axis, one or more inlet pipes which pass a mixture of exhaust gas and air substantially tangentially into the chamber near to one end thereof, and an outlet pipe near to the other end of the chamber and which is so arranged that exhaust gas leaves the chamber substantially tangentially. The tangential inlet and tangential outlet of gases minimizes energy losses in the gas passing through the reactor. The ratio of the cross-sectional areas of the inlet pipe(s) to reactor chamber is preferably from 1:9 to 25:36, and similar ranges of cross-sectional area ratios are preferred for the outlet pipe and chamber. The ratio of the length of the reaction chamber to diameter is preferably from 1:1 to 4:1.

The chamber may be cylindrical or divergent from inlet end to outlet end and may be thermally insulated.

1 Claim, 23 Drawing Figures

EXHAUST GAS REACTOR

This is a continuation of application Ser. No. 459,588, filed Apr. 10, 1974, now abandoned.

The present invention relates to reactors and methods of treating exhaust gas from internal combustion engines.

Thermal reactors are known for the combustion of unburnt materials contained in the exhaust gases of an internal combustion engine, in particular for motor vehicles, within which the gas particles acquire speeds which in value and direction are close to those of a vortex as defined by the theory of aerodynamics: reactors of this type are of cylindrical shape and consist of a metal casing comprising a lateral wall defining the sides of the chamber, the ends of the chamber being closed by two end walls. Near to one of the said end walls the cylindrical lateral wall is apertured and fitted with an exhaust gas inlet pipe having an axis lying on a plane that is substantially normal to the axis of the cylinder and arranged at an appropriate distance from the axis itself, so that this inlet pipe is substantially tangential to the cylindrical wall; the second of the said end walls is apertured in the centre and fitted with a gas outlet pipe so that the outlet pipe is substantially coaxial with the axis of the cylinder. A reactor of this type has the advantage of being devoid of deflectors or other plate component which would be in contact with the gas on both faces and would be subjected to excessive heat stresses as well as to corrosion and erosion. By complying with the vortex law or equation as defined in aerodynamics, each of the particles of gas at the various points inside the cylindrical casing assumes or tends to assume a rotational movement about the axis of the cylinder at a speed represented by a vector lying on a plane which is substantially normal to the axis of the cylinder, having a direction normal to the line which on the said plane joins the particle with the axis of the cylinder; the value of this velocity is, according to the vortex law, inversely proportional to the value of the distance along the said line joining the particle with the rotation axis and it increases according to a hyperbolic equation as it proceeds along the radius of the cylindrical part towards the axis. In this way a thin cylindrical film of gas can be considered to revolve as if it were solid about the axis; and the speed of the particles of this film is higher in relation to the velocity of the particles of the external adjacent film and lower in relation to the speed of the particles of the internal adjacent film; there is thus obtained a relative flow of the various films in relation to one another, which may be a laminar type of relative flow, or else turbulent. This relative flow of the various films of gas between one another makes it possible for all the molecules of combustible components of the exhaust gas dispersed in one film to come rapidly into contact with the molecules of the gas containing oxygen (e.g. air which is injected into the exhaust gas before entering the reactor) dispersed in an adjacent film; this gives rise to the extremely rapid and almost complete combustion that characterises these types of thermal vortex reactors. Obviously, the situation inside these reactors is not as simple as so far explained in the cylindrical cavity near the inlet there is in fact a transistion zone from the velocity profile or distribution of the entering fluid to the velocity profile or distribution of the vortex type; near the outlet there is also a transition zone from the velocity profile or distribution of the vortex type to the velocity profile or distribution of the emerging fluid; but even in the intermediate zone of the cylindrical cavity, radial and axial velocity vectors induced by the flow of gas through a reactor add to the tangential velocity vectors induced by the vortex it is the radial component that replenishes the vortex with energy and sustains it, since the relative flow of the various films of gas between one another, as described above, is of the dissipative type.

With a reactor of this type, however, in the central part of the vortex, there are obtained very high speed values, although the vicosity of the gas prevents its velocity from attaining the theoretical infinite value at the centre as would be required by the theoretical vortex law. Moreover, the gas leaves the outlet pipe with tangential speeds that are also very high, which then through friction are reduced during passage along the pipe itself. The energy needed for the creation of the vortex, that relating to its maintenance and the kinetic energy of the emerging gas, are furnished to the gas in the form of differences of pressure between the inlet and the outlet of the reactor. These types of reactor therefore generally give rise to considerable back-pressure at the exhaust port(s) of the engine; this often brings about an excessive decrease in the performance of the engine itself.

The changes and the values of the speeds inside the reactor, according to what is explained above, depend on the design and the dimensioning of the reactor in relation to the amount of the gas passing through: the intensity of the vortex depends on the velocity of the gas in the inlet pipe and on the distance of the axis of this pipe from the axis of the cylinder; the amount of kinetic energy due to the tangential component of the gas emerging from the reactor depends on the diameter of the outlet pipe. By varying these dimensions, attempts have been made to reduce to a minimum the pressure difference between the inlet and the outlet of the reactor, while maintaining at an acceptable level the efficiency of conversion of noxious combustible components of the exhaust gas; nevertheless, the results obtained have not been satisfactory since, especially with some types of engine, the decrease in performance through the effect of back-pressure was found to be excessive.

The purpose of the present invention is to provide a thermal vortex reactor for treating exhaust gas from internal combustion engines which makes it possible to avoid the drawbacks of known reactors, while retaining their advantages, and in particular in which the energy of formation of the vortex is minimised with maintenance of the vortical movement of the gas, the energy supplied to the exhaust gas being acceptably small, and there being in consequence only a relatively small decrease in the total efficiency of the engine.

The present invention provides a reactor for treating exhaust gas from an internal combustion engine comprising a lateral wall defining a hollow chamber of circular cross-section and substantially circular end walls defining the opposite ends of the chamber, at least one inlet aperture in the lateral wall adjacent to one end wall and an inlet pipe joined to the lateral wall and arranged to direct exhaust gas through the inlet aperture into the chamber substantially tangentially to the lateral wall so that, during operation, exhaust gas will circulate in a vortex substantially parallel to the lateral wall, an outlet aperture in the lateral wall adjacent to the other end wall, and an outlet pipe joined to the lateral wall and arranged for receiving gases substantially tangentially from the chamber via the outlet aperture.

The reactor of the invention provides improved exhaust gas flow, particularly by inhibiting or diminishing the formation of a vortex in axial regions of the reactor where the kinetic energy would be too high without a correspondingly high efficiency of local combustion.

The reactor of the invention enables the recovery of a substantial proportion of the kinetic energy of the vortex as pressure energy at the reactor outlet, so that the pressure drop across the reactor is reduced in comparison with pressure drops across previously known vortex flow thermal reactors.

Preferably the end walls are substantially perpendicular to the axis of the hollow chamber. The lateral wall may be define either a cylindrical chamber or alternatively a chamber having the form of a truncated cone at least between the radial planes of the inlet and outlet apertures, the diameter of the chamber being greater in radial planes including the outlet aperture than in radial planes including the inlet aperture.

In the reactor of the invention, it is particularly advantageous from the point of view of reducing fluid energy losses in the reactor to adopt certain ranges of proportions between the inlet pipe(s) and the reactor chamber, and between the outlet pipe and the reactor chamber. When there is a single inlet pipe, the ratio of the diameter of the pipe to the diameter of the chamber should be preferably in the range of from 1:3 to 2.5:3.0 (i.e. cross-sectional area ratios of 1:9 to 25:36), more preferably 1:3 to 2:3 (area ratios of 1.9 to 4:9), and most preferably $\frac{1}{2}$ approximately. For a plurality of inlet pipes, the sum of the cross-sectional areas should be in the range of ratios of from 1:9 to 25:36, preferably 1:9 to 4:9, relative to the cross-sectional area of the chamber. Normally, a single outlet is provided on the chamber, and the ratio of the diameter of the outlet pipe to the reactor chamber should preferably be in the range of from 1:3 to 2.5:3.0 (area ratios of from 1:9 to 25:36) and more preferably in the range of from 1:3 to 2:3 (area ratios of from 1:9 to 4:9), most preferably approximately $\frac{1}{2}$. Obviously, if the inlet and/or outlet apertures and types are not of circular cross section, said values are referred to the ratios of the width of the pipes and planes perpendicular to the reactor axis to a diameter of the reactor in those planes. By adopting these relative dimensions, energy dissipation due to passage through the reactor is minimized for acceptable exhaust emission treatment to reduce the content of unburned hydrocarbons and carbon monoxide.

The efficiency of oxidation of unburned components of exhaust gas and the pressure drop through the reactor is also influenced by the ratio of the length of the chamber to the diameter thereof. Preferably, the length/diameter ratio is in the range of from 1:1 to 4:1, and more preferably from 2:1 to 3:1. For a typical European automobile engine of 1$\frac{1}{2}$ to 2.0 liters capacity, the length to diameter ratio is preferably about 2.5:3.0 for an optimum combination of exhaust gas purification and pressure drop.

The reactor may be provided with an outer jacket or shell surrounding the lateral and end walls and defining therewith an insulating gap. The provision of such an insulating gap is advantageous from the point of view of reducing the warmup time from cold of the reactor and of maintaining its operating temperature during operation. The reduced heat loss from the reactor is also beneficial to some extent in avoiding undue underhood temperature increases. Provision may be made for the passage of air into the insulating gap, and for air to pass out therefrom. Preferably, at least some air thus passing out from the insulating gap is passed into the reactor as secondary air which is mixed with exhaust gas in the vicinity of the exhaust port (e.g. in the inlet pipe) and/or passed directly into the reactor via suitable apertured means at or near the end wall of the chamber adjacent to the inlet aperture. In this way, heat losses from the chamber are recovered by utilizing air from the insulating gap as secondary combustion air.

The invention also provides the combination of an internal combustion engine having at least one exhaust port with a reactor as above described, the inlet pipe of the reactor being connected to receive exhaust gas from the exhaust port, and there being means for supplying air to the reactor for reaction with combustible components in the exhaust gas. The said air supply means may be an air pump or fan and a pipe for conducting at least some air from the pump or fan to the inlet pipe or the region of the exhaust port.

The volume of the reactor is preferably in the range of 50% to 100% of the effective or equivalent swept volume of the engine, and more preferably from $\frac{2}{3}$ to $\frac{3}{4}$ of the swept volume.

The invention further comprises a method of treating exhaust gas from an internal combustion engine comprising directing hot exhaust gas from the engine tangentially into one end of a chamber which is substantially circular in cross-section and which has a tangential outlet at the other end so that the gas tends to form a vortex and to follow a helical path to the outlet, and discharging exhaust gas tangentially to atmosphere via the outlet and a tangentially arranged outlet pipe.

The invention will now be described with reference to a number of non-limitative embodiments thereof illustrated in the accompanying drawings in which.

Figure 1:
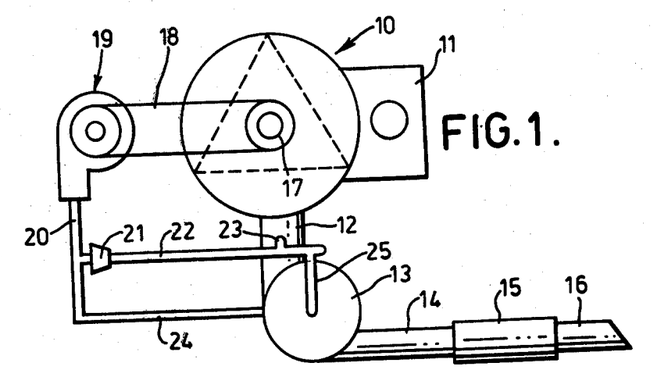
FIG. 1 shows a schematic arrangement of a system comprising a rotary piston engine in combination with a thermal reactor, in accordance with the invention.

Reference is first made to FIG. 1 in which 10 indicates a rotary piston engine (e.g. a Wankel engine) having a carburretor 11. Exhaust gas from the engine is discharged into the upstream end of a conduit 12, the downstream end of which is attached tangentially near one end of the lateral wall of a cylindrical reactor 13, of which further details are given below. The exhaust gas circulates in a vortex around the reactor 13 due to its tangential entry path, and is discharged via a tangentially arranged exhaust conduit 14 near the other end of the lateral wall of the reactor which is upstream of a conventional silencer or muffler 15 and tail pipe 16. A pulley 17 rotated by the engine 10 drives a belt 18 which in turn operates an air fan 19. Air is discharged from fan 19 to a pipe 20, and most (or if desired, all) of the air is passed via a regulating valve 21 into a pipe 22. The air in pipe 22 constitutes all, or the main part of the secondary combustion air and is passed via one or more tubes 23 into the conduit 12, preferably as close as possible to the exhaust port of the engine. The turbulence in the conduit 12 promotes good mixing of the hot exhaust gas and air, and oxidation of unburned fuel components proceeds effectively between tubes 23 and the discharge orifice from the reactor 13 to the upstream end of the exhaust pipe 14.

The balance of the air which does not pass via the regulating valve 21 to the pipe 22 is conducted by a pipe 24 to an insulating space (not shown in FIG. 1) around a hot inner reactor casing where it recovers heat which might otherwise be dissipated to the surrounding ambient air, and heated air from the insulating space is passed via a tube 25 to an extension of pipe 22 and thence via tubes 23 into the conduit 12 where it serves as additional secondary air.

Figures 2, 6:
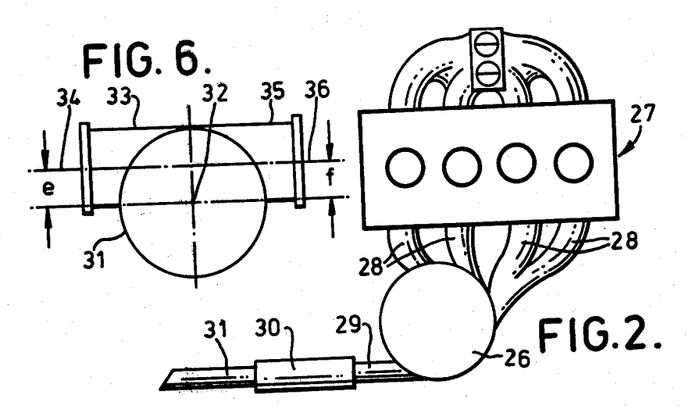
FIG. 2 shows schematically a combination similar to that of FIG. 1 but with an in-line multi-cylinder reciprocating piston engine and a thermal reactor adapted for use with the engine.
FIGS. 6, 8, 10 and 12 are respective plan views thereof.

In FIG. 2, a reactor 26 is shown attached to receive hot exhaust gas from the exhaust ports of a 4-cylinder in-line reciprocating piston engine 27. The hot gas is directed from each port tangentially into the reactor 26 near one end thereof by a respective conduit 28. The hot gas circulates in a vortex helically towards a tangential outlet pipe 29 near the other end of the reactor 26. The exhaust gas is discharged to atmosphere via a silencer 30 and a tail pipe 31.

FIGS. 3-14 shows reactors particularly, but not exclusively suitable for use with engines having a single exhaust port, for example rotary piston engines.

Figure 3:
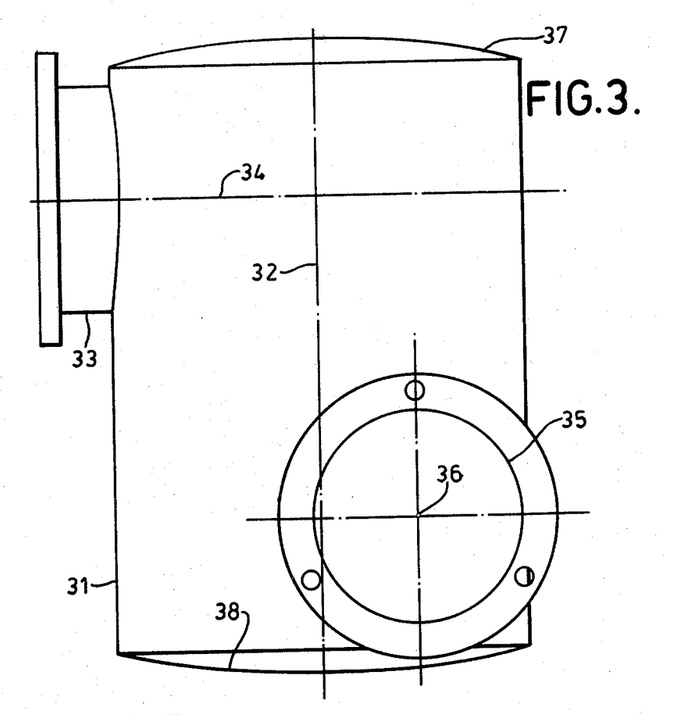
FIG. 3 is a side elevational view of one form of reactor in accordance with the invention.

The reactor shown in FIG. 3 includes a wall 31 forming a cylindrical surface about the axis denoted by 32, and closed by two walls 37 and 38 with a substantially flat or slightly dished base, whose circular edges are welded to the circular edges at the end of the wall 31. 33 denotes the inlet pipe for admitting the hot exhaust gas to the reactor, which pipe has the axis denoted by 34 and represented by a dash-dotted line; the axis 34 lies on a plane normal to the axis 32 and the pipe 33 is therefore arranged tangentially in relation to the cylindrical casing 31, and to the chamber bounded by it; 35 denotes the outlet pipe for the gas from the reactor having the axis denoted by 36 on a plane normal to the axis 32; the pipe 35 is therefore arranged tangentially in relation to the cylindrical wall 31 and the chamber bounded by it; the inlet pipe 33 is arranged near the bottom wall 37, and the outlet pipe 35 is arranged near the bottom wall 38.

Figure 4:
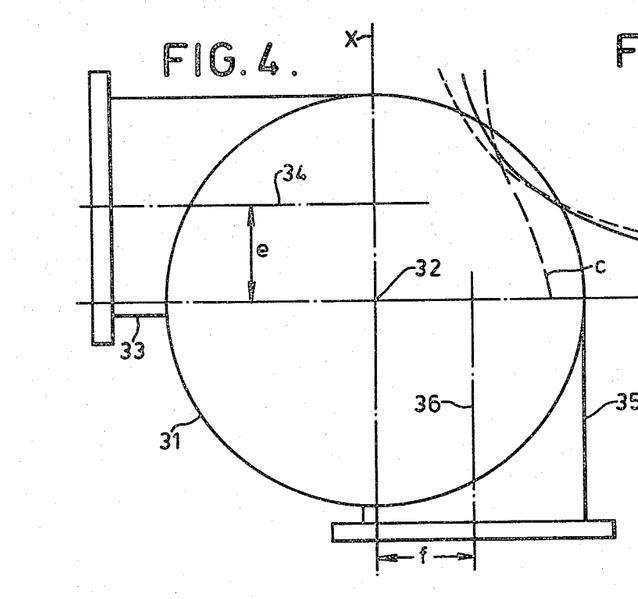
FIG. 4 is a plan view thereof.

In FIG. 4, which shows a plane cross-sectional view of the reactor shown in FIG. 3, there are shown by way of explanation some curves relating to the distribution of gas velocities inside the reactor. The speeds shown in the graph are the tangential components of the speeds of "particles" of gas arranged along the radius denoted by X normal to the axes 32 and 34 and lying on the plane normal to the axis 32 and containing the axis 34. Obviously, what will be said for the particles of gas disposed along radius X is substantially valid also for the particles arranged along the other radii normal to the axis 32 both on the plane under consideration and on other planes parallel thereto inside the cylindrical casing 2; the speeds are represented by curves on a Cartesian diagram having as the abscissae the axis X and as axis of the ordinates the line denoted by Y normal to the axis X, and like that latter lying on the plane normal to the axis 32 and containing the axis 34. For the various points of the line X having as abscissae the various distances r from the axis 32, there are given as ordinates the speeds W in relation to the actual points. The pecked curve a denotes the speeds at the various points in the case of the theoretical vortex; this is obviously a hyperbola according to the equation $W \cdot r = \text{constant}$, on the basis of which W is infinite for $r = 0$. The curve b denotes, on the other hand, the speeds that are obtained with a reactor having a vortex reactor of known type, i.e. with axial outlet pipe; the theoretical vortex equation is respected in practice, except that in the central zone very close to the axis, the value of the velocity is not of course infinite; it is nevertheless very high so that accordingly the energy of formation of the vortex is very high and as is also the energy required for its maintenance in relation to dissipation losses; the bulk of the energy thus transferred to the fluid is from the fluid itself and is preserved in kinetic form in the outlet pipe and therefore dissipated by friction along the pipe itself. The curve c represents on the other hand the speeds that are obtained with the vortex reactor of the present invention on the basis of the concepts explained above: the configuration of curves b and c is that resulting from practical experimental findings; curve a, on the other hand, is, as stated, theoretical.

A considerable difference is apparent between the shape of the curve b and that of the curve c: this is particularly so in that the velocity and hence the kinetic energy in the zone closest to the axis, is much lower with the reactor of the invention, so that the energy employed to promote and maintain vortex flow is relatively low. In some instances, the momentum of gas circulating in the reactor can tend to improve scavenging of the engine and at least in some aspects to improve the performance of the engine.

Figure 5:
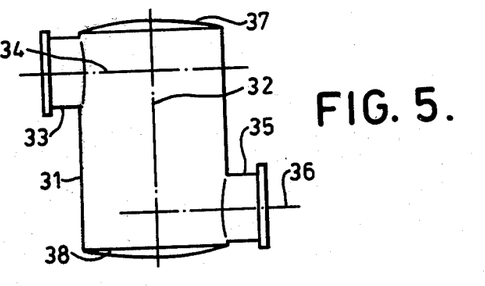
FIGS. 5, 7, 9 and 11 are side elevational views of other reactors of the invention.

FIGS. 5 and 6 show a reactor in which the outlet pipe 35 for the treated exhaust gas is arranged tangentially in relation to the cylindrical wall 31, but the axis of the outlet pipe is situated on the plane parallel to the axis 32 on which lies the axis 34 of the inlet pipe 33. This form of the reactor in accordance with the invention may be used when engine layout requires the inlet and outlet pipes to be in the same plane.

Figures 7, 8:
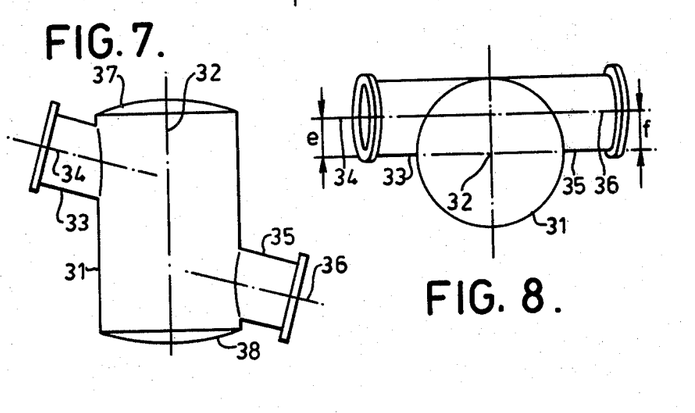

In the reactor shown in FIGS. 7 and 8 the axes of the inlet pipe 33 and outlet pipe 35 for the gas lie on planes inclined at a certain angle in relation to the axis 32 of the cylindrical wall; the angle of the inlet and outlet pipes relative to axis 32 enhances further the helical vortical motion of the gases inside the reactor.

Figure 9:
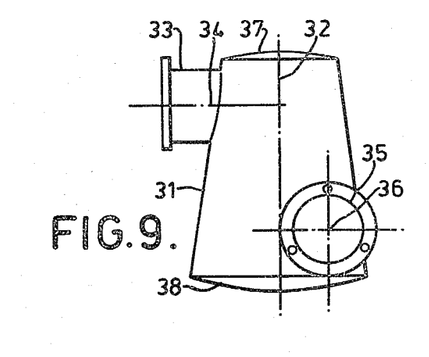
Figure 10:
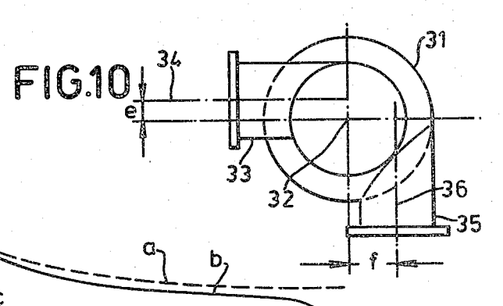

FIGS. 9 and 10 represent a reactor with the lateral wall 31 in the form of a truncated cone between the end walls 37, 38 and diverging towards wall 38, so that the tangential speed of the gases decreases from the inlet zone of the inlet pipe 33 to the outlet zone of the outlet pipe 35.

Figure 11:
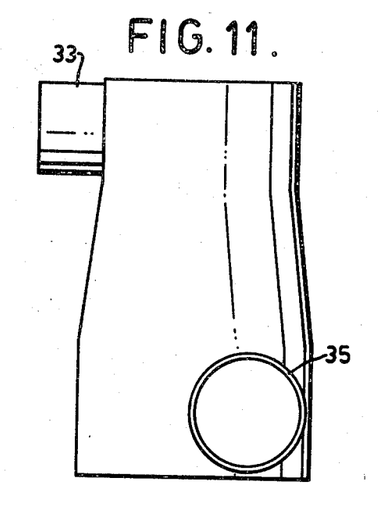
Figure 12:
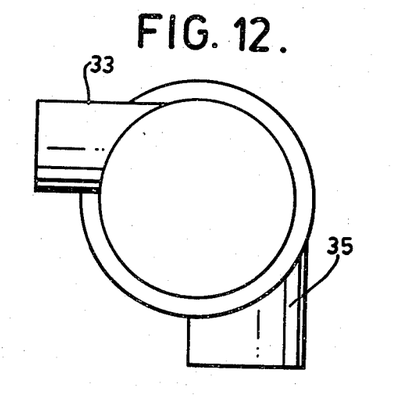

FIGS. 11 and 12 show another reactor in which the inlet pipe 33 discharges tangentially into a cylindrical portion of the reactor at one end thereof and the outlet pipe 35 discharges tangentially from a cylindrical but wider portion at the other end thereof. This reactor was employed on a rotary piston (Wankel-type) engine. The principal dimensions of the reactor are:

- inlet pipe: 37 mms diameter
- reactor at inlet pipe: 84 mms diameter
- outlet pipe: 50 mms diameter
- reactor at outlet pipe: 100 mms diameter
- reactor length: 166 mms overall.
- inlet end cylindrical portion: c0.46 mms
- outlet end cylindrical portion: c0.56 mms Tests were made to evaluate the performance of the reactor of the invention as embodied by FIGS. 11 and 12, in comparison with a Wankel type engine having no reactor, the same engine with a commercially available reactor (B) consisting merely of a cylinder into one axial end of which exhaust gas and secondary air are injected and from the other axial end of which exhaust gas is discharged and a reactor (C) having a tangential inlet but an axial outlet. The test results are given in table I.

TABLE I

| European Procedure | Grams/Test CO | Grams/Test HC | Conversion % CO | Conversion % HC |
|---|---|---|---|---|
| (1) No reactor | 242 | 18.26 | — | — |
| (2) B with reactor B | 54.8 | 2.74 | 77 | 85 |
| (3) with reactor C | 15.68 | 2.0 | 93 | 89 |

| U.S. Federal Procedure | C.V.S. 1975 CO | FTP HC | GR./MILE NO. | Average Press. Drop in Reactor (mms.Hg) |
|---|---|---|---|---|
| (4) with reactor C | 10.26 | 1.0 | 1.2 | c.300 |
| (5) reactor of invention | 7.34 | 0.88 | 0.81 | c. 20 |

Clearly, tests (1), (2) and (3) demonstrate that reactor C is greatly superior to reactor B, but tests (4) and (5) show not only a striking improvement in all pollutant reduction with the reactor of the invention relative to reactor C, but also a pressure drop of 6.6% of that of reactor C. The power and fuel consumption of an engine fitted with the reactor of the invention are thus little affected by the reactor despite its excellent performance in reducing noxious pollutants. Moreover, the warmup time of the reactor of the invention is less than 40 seconds, 30 seconds being fairly typical, and this compares favourably with the warmup time of 60–120 seconds of commercially available thermal reactors.

As shown in FIGS. 3–12 described above, the outlet pipe is arranged tangentially in relation to the lateral wall fairly close to the end wall remote from the inlet pipe; the direction of the gas movement in the outlet pipe must obviously coincide with that induced in the gas in the outlet zone. This shows that the gas delivery is not all compelled (with a considerable component of radial velocity) to reach the central zone about the axis, as takes place in the known types of vortex flow reactors having an axial outlet in the end wall remote from the inlet; in consequence, in the central zone of the reactor according to the invention it is not possible to attain the very high speeds of the theoretical vortex, owing to the fact that there is a substantially no radial flow that might otherwise supply to the fluid the dissipative energy necessary for the maintenance of the theoretical vortex near the central zone. With the tangential arrangement of the outlet pipe, there is moreover obtained at the same time a recovery of pressure energy from the kinetic energy of the vortex movement; in the outlet zone there is thus obtained the reverse in relation to that which takes place in the inlet zone, at least to a certain degree. From the central zone of the vortex, characterised by higher tangential velocities the fluid passes gradually, as a result of a centrifugally promoted radial velocity component, to the peripheral zone adjacent the lateral wall of the reactor; the peripheral zone is characterised by lower tangential velocities which are of the same order of magnitude as the velocities in the outlet pipe; the recovery of kinetic energy can obviously be enhanced if the reactor chamber diverges gradually to the outlet as shown in reactors of FIGS. 9, 10, 11 and 12 rather than being wholly cylindrical; from theoretical considerations of vortex dynamics, the increasing diameter of the reactor towards the outlet produces a slowing down of the tangential speed of the gas.

It has been noted that with a tangential, instead of an axial outlet, the gas is not compelled to reach the central part of the reactor and this central part might thus not be affected by the incoming gas, since it could rotate like a solid body without gas circulation or interchange between the central core and the peripheral zone; the presence of a potentially stable core or nucleus would reduce the useful volume of the reactor, and therefore the average time each particle of gas remains in the reactor, the average time being determined by the useful volume of the reactor, and the rate of gas throughout. Obviously the "average time" is one of the factors affecting the efficacy of the reactor. The formation of a useless and stable core or nucleus, is avoided by adopting a ratio between the diameter of the reactor and the diameter of the inlet pipe and preferably also of the outlet pipe of approximately 2.0. With this order of relative dimensions, the formation of a stable central central nucleus is avoided to a substantial extent by the dynamic action of the incoming gas.

Figure 13:
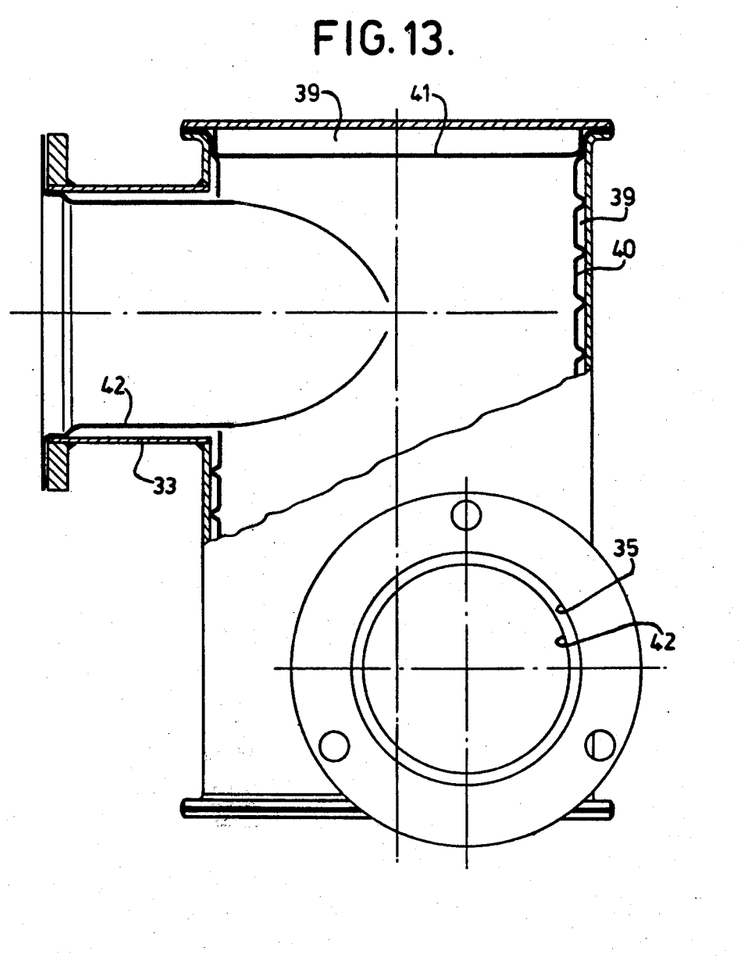
FIGS. 13, 14 and 15 are part sectional elevations through other reactors of the invention.

FIG. 13 shows in partial section a reactor in accordance with the invention similar to that shown in FIGS. 3 and 4, but provided with thermal insulation means to improve heat retention: the outward transfer of heat is reduced by the presence of air gaps 39, containing almost stationary gas, provided by an internal lining 40 of the reactor casing, by bottom or end plates 41 corresponding to the end plates of the body of the reactor, and by lining 42 internally of the walls of the inlet and outlet pipes 33 and 35.

The linings 40, 41 and 42 are formed of thin stainless steel plate attached by crimping or expansion into engaging contact with the reactor wall (or by any other suitable method). Thermal insulation is useful to avoid the cooling of the gas inside the reactor and to prevent an excessive thermal exchange with the surrounding zone, for instance with superheating of the space under the hood of an automobile.

Figure 14:
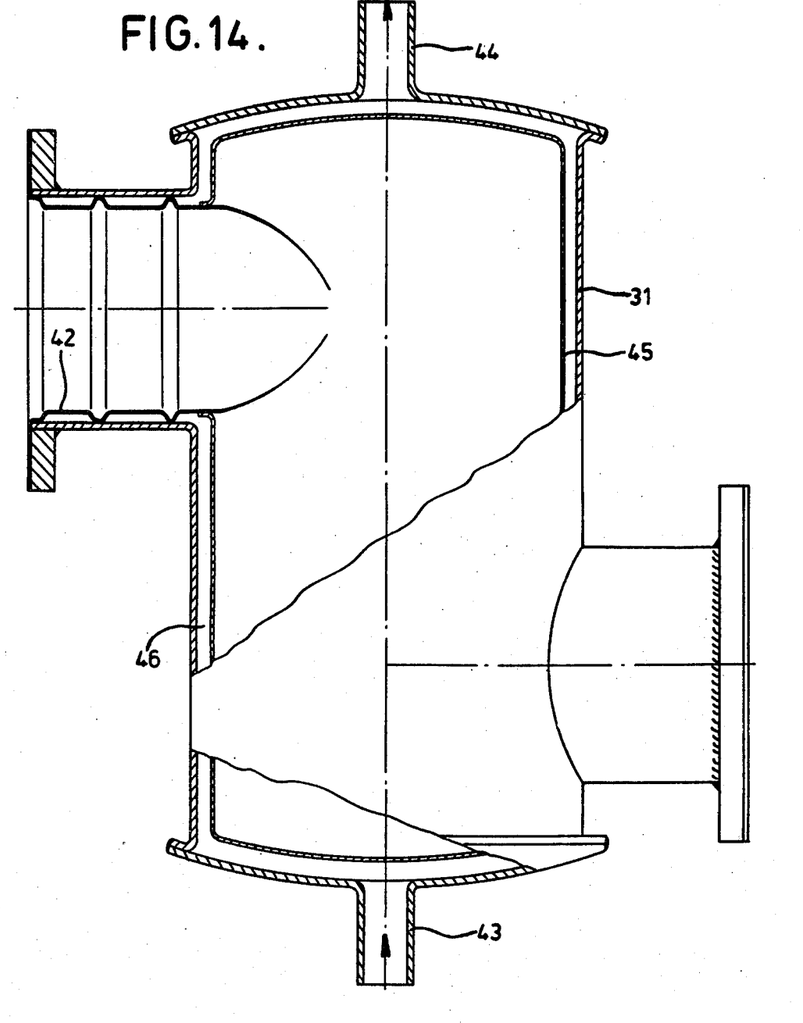

FIG. 14 depicts a version of the vortex reactor having a double wall with an insulating gap between, in which a thin metal sheet inner wall 45 extends parallel to the outer casing 31 providing a continuous air gap 46 having an air inlet opening 43 and an outlet opening 44: cooling air is blown into the opening 43 for instance from the pump which is employed to supply, upstream of the reactor, the air needed for combustion of unburned components of the exhaust gas in the reactor; the air emerging from the pipe 44 can also be used for combustion by injecting it into the exhaust gas upstream of the reactor as depicted in FIG. 1; by injecting the thus preheated air in this way there is obtained a certain compensation for heat lost by the gas in the heat exchange with air through the inner plate 45.

Figure 15:
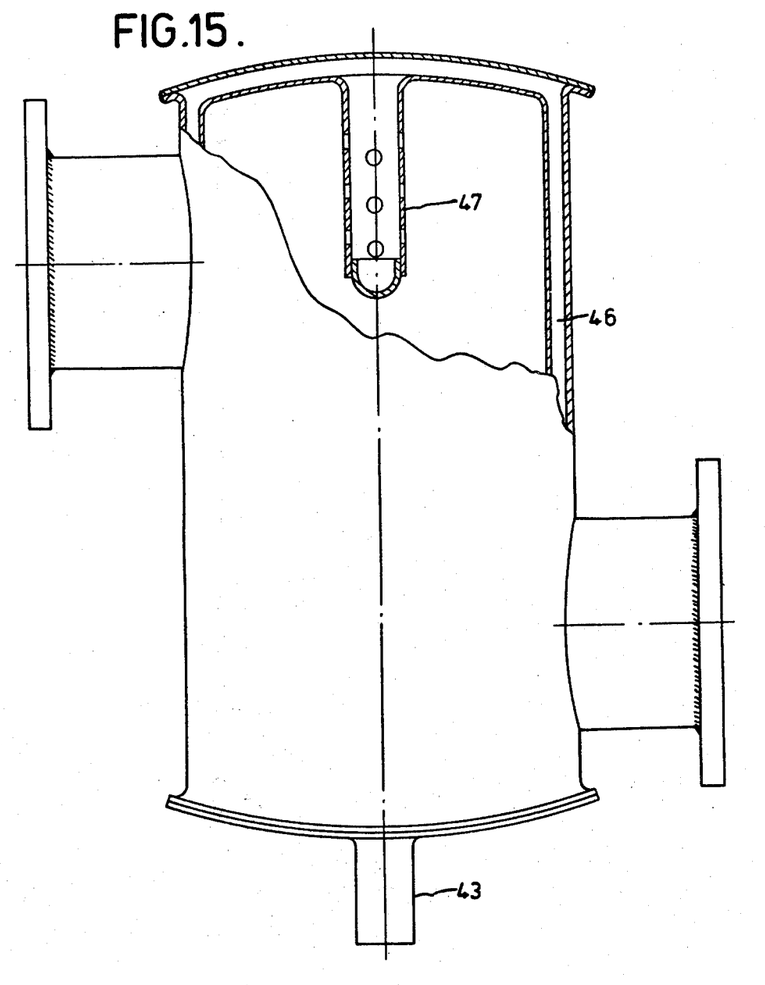

FIG. 15 shows a further version of the reactor, similar to that shown in FIG. 14, but in which the cooling air supplied through the opening 43 passes directly from the gap 46 into the cylindrical casing of the reactor in its central zone through a drilled pipe 47; it should be noted that the pressure in the central zone of the vortex can be less than the external atmospheric pressure for most types of vortex in normal circumstances, but this may also be so if the back-pressure of the exhaust system downstream of the vortex reactor is low: in this case air will be induced through the perforations of pipe 47 without any pumping through the mouth 43.

Figure 16:
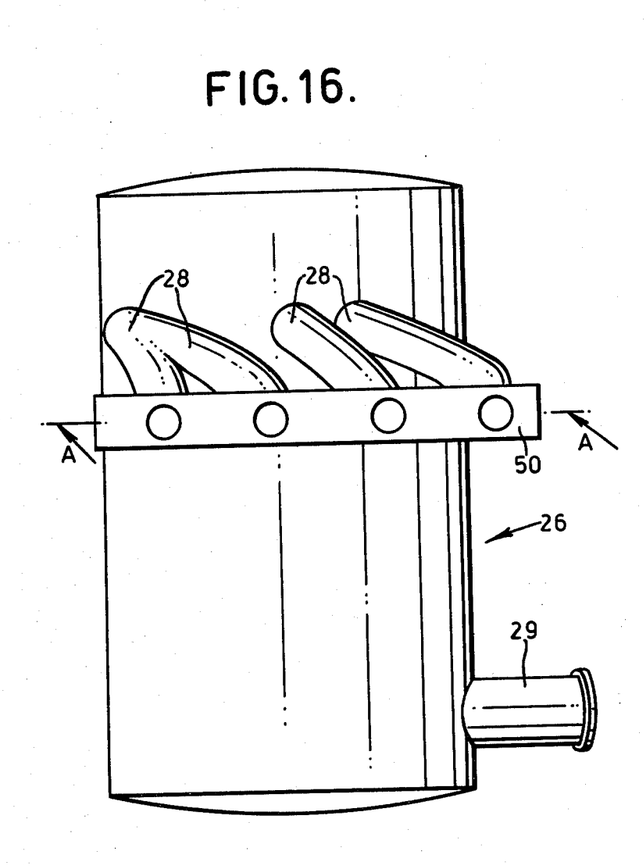
FIG. 16 is a perspective view of a reactor suitable for use on a 4-cylinder reciprocating piston engine.

The reactor shown in FIG. 16 is of the same basic construction as that depicted in FIGS. 3 and 4 except that the single tangential inlet pipe 33 of FIGS. 3 and 4 is replaced by four tangential inlet pipes 28 each for receiving exhaust gas from a respective one of four exhaust ports. For convenience in attaching the inlet pipes 28 to the engine (item 27 in FIG. 2), the upstream end of each pipe 28 may be attached to an orificed attachment plate 50.

Figures 17, 18:
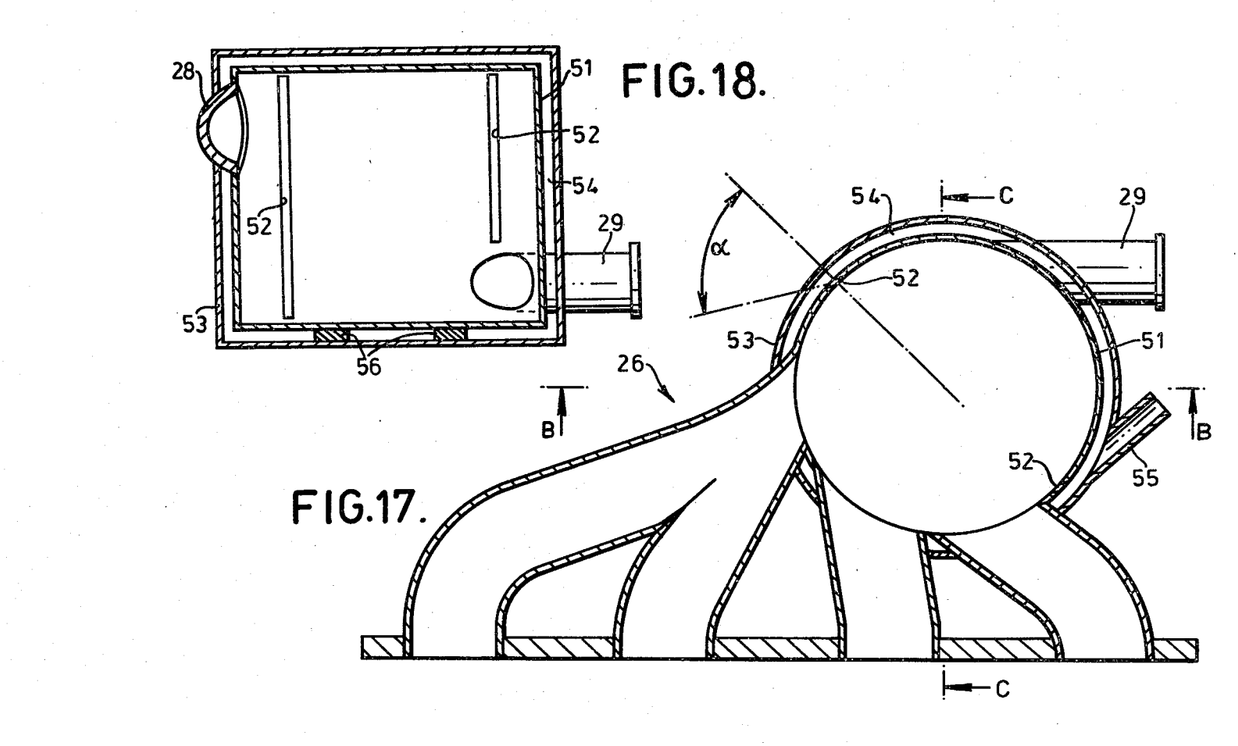
FIG. 17 is a diagrammatic cross-sectional view of the reactor of FIG. 16 in the plane A—A showing some modifications thereto.
FIG. 18 is a vertical sectional view through the reactor of FIG. 17 taken on the line B—B of FIG. 17.
Figure 19:
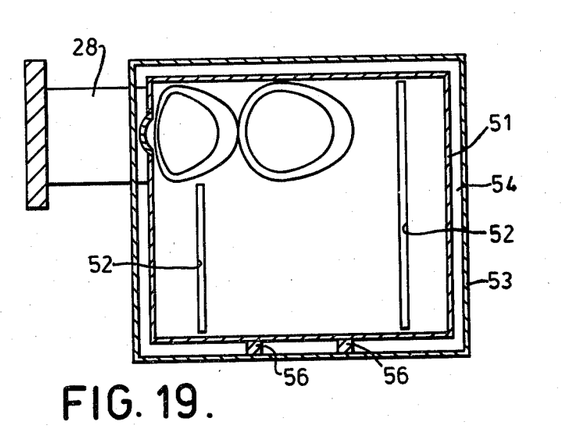
FIG. 19 is a vertical sectional view of the reactor of FIG. 17 taken on line C—C thereof.

FIG. 17 shows a cross-sectional plan view of a modified form of the reactor of FIG. 16, the cross-section being in the plane A—A of FIG. 16. In this modified form, the reactor wall 51 is formed with slits 52 parallel to the axis of the lateral wall, the slits 52 extending almost the whole axial length of the wall between the ends thereof and/or between the inlet and/or outlet apertures. The extent of the slits 52 can be seen in FIG. 18 which is an axial cross-section on lines B—B of FIG. 17 and in FIG. 19 which is an axial cross-section on line C—C of FIG. 17. The reactor wall 51 is enclosed in a steel jacket 53 with a gap 54 between the wall 51 and the jacket 53. Air is passed into the gap 54 in any convenient manner, e.g. as described with reference to FIGS. 14 and 15. However, it is preferred to pass air from an air pump or fan (not shown) via a tube 55 into the gap 54. Preferably the tube 55 directs air into gap 54 approximately tangentially so that the air is distributed substantially evenly around the gap 54. The slits 52 are formed at an acute angle alpha to a radius from the centre of the reactor and inclined in a direction opposed to the direction of air circulation in the gap 54 so as to direct a proportion of the air into the reactor chamber in the form of a film which follows the contour of the wall 51 in the same circulating sense as exhaust gas. The relatively cool air film serves to protect the interior wall against erosion and also provides secondary air for combustion of unburned exhaust gas components. The angle alpha is preferably the range of from 30° to 75°. The wall 51 may be secured relative to the jacket 53 in any convenient manner, e.g. by spacing members or shims 56.

Figure 20:
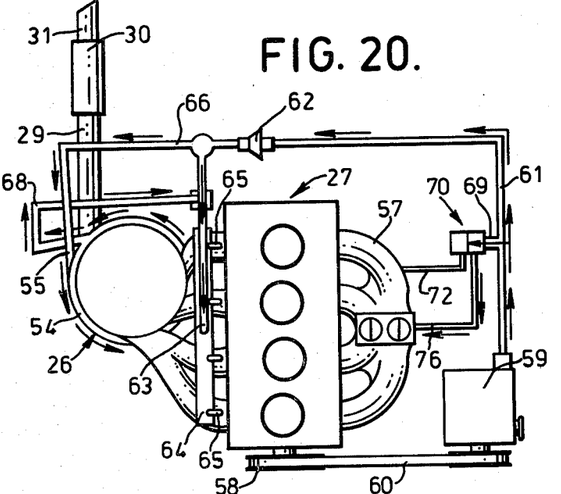
FIG. 20 illustrates schematically a reactor of the type shown in FIG. 17 in combination with a four-cylinder automobile engine.

FIG. 20 shows a reactor 26 of the type shown in FIG. 16 or FIG. 17 incorporated as part of an engine with its fuel system and exhaust system. The engine 27 is supplied with air and fuel via intake pipes of a manifold 57. A pulley 58 driven by the engine rotates an air pump 59 by a belt 60. Air at a slight overpressure passes along tube 61 and a check valve 62 (which prevents the communication of pressure fluctuations from the engine exhaust system to the tube 61) to a T-junction, and most of the air then passes via orificed distribution tube 63 into an air manifold 64. Air from the manifold 64 is injected via tubes 65 into the upstream ends of the tangential inlet pipes 28 of the reactor, preferably as closely as possible to the engine exhaust ports. The injected air serves as secondary combustion air and is thoroughly mixed with the turbulent gases leaving the exhaust ports, and excellent conversion of CO and HC's to fully burned products takes place in the pipes 28 and the vortex chamber of the reactor 26. The exhaust gas passes out of the chamber via tangential outlet pipe and thence to atmosphere via silencer 30 and tail pipe 31. The balance of the air which does not pass into tube 63 for use as secondary air is conducted along tube 66 to be introduced by tube 55 into the annular gap 54. If the reactor 26 has slots, such as the slots 52 shown in FIGS. 17-19, all or most of the air will pass from the gap 54 into the reactor chamber. Any surplus of air from gap 54, or all of the air from gap 54 if no slots 52 are provided, is recirculated by tube 68 to tube 63 for use as additional secondary air. Valves (not shown) may be provided in tubes 62, 63, 66, 68 to ensure that the desired proportions of air flow in each tube, and check valves 62, 62a to prevent the communication of exhaust pressure fluctuations to the air tube 61.

Figure 21:
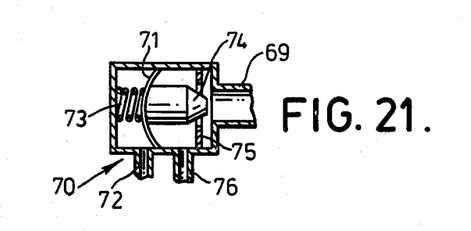
FIG. 21 shows the principal features of a valve used in the engine/reactor system of FIG. 20.

Between the pump 59 and the valve 62, the tube 61 has a T-connection 69 to a so-called "gulp valve" 70, shown in greater detail in FIG. 21. The gulp valve 70 comprises a hollow body divided into two chamber by a flexible diagram 71. One chamber is connected by a tube 72 to the intake manifold 57 and contains a spring 73 which urges a tapered valve needle 74 towards an orifice in a plate 75 in the other chamber. Between the diaphragm 71 and the plate 75, is a tube 76 connecting the intake manifold 57 to the other chamber. When the pressure in the inlet manifold 57 falls below a predetermined value, the low manifold pressure is communicated to the gulp valve 70 via tube 72, and the diaphragm is moved against the compression of the spring 73 to lift the tapered needle 74 out of the orifice in the plate 75. Air is now able to flow via the tube 69, orificed plate 75 and tube 76 to the intake manifold 57, thereby diluting the fuel-air mixture therein which tends to become too rich during engine deceleration. As a result of this dilution, the amount of unburned fuel components in the exhaust gas is maintained at a relatively low level, thereby avoiding excessively high temperatures in the reactor 26 during the final purification therein. The avoidance of excessive temperatures prolongs the life of the reactor.

Figure 22:
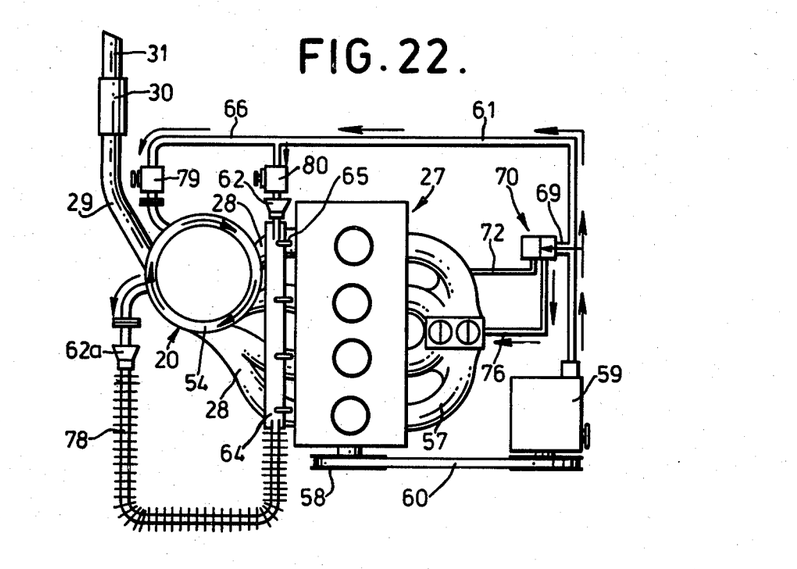
FIG. 22 depicts schematically the combination of a four cylinder automobile engine with a reactor of the type shown in FIG. 17.

The system of FIG. 22 is generally similar to that of FIG. 20, the main difference being that air which has circulated around the gap 54 between the inner wall of the reactor 26 and the surrounding outer wall passes to the air manifold 64 via a finned pipe 78 to dissipate heat before injection as part of the secondary air via tubes 65. Regulating valves 79, 80 are provided to ensure that the desired proprotions of air flow to the gap 54 and the secondary air manifold 64 respectively.

The reactor of the invention when adopted for use with multicylinder engines provides excellent conversion of carbon monoxide and unburned hydrocarbons with a smaller pressure drop and a shorter warmup time than previously known thermal reactors. The power loss for an engine of about 120 brake horse power is between 1% and 2%, and the warmup time about 35 seconds.

It will be appreciated that various modifications can be made to the reactors described with reference to FIGS. 2, 16-19, 20 and 22 without departing from the invention. In particularly, the forms of constructions adopted for the reactors of FIGS. 3-5 may be employed for reactors having a plurality of exhaust gas inlets.

Figure 23:
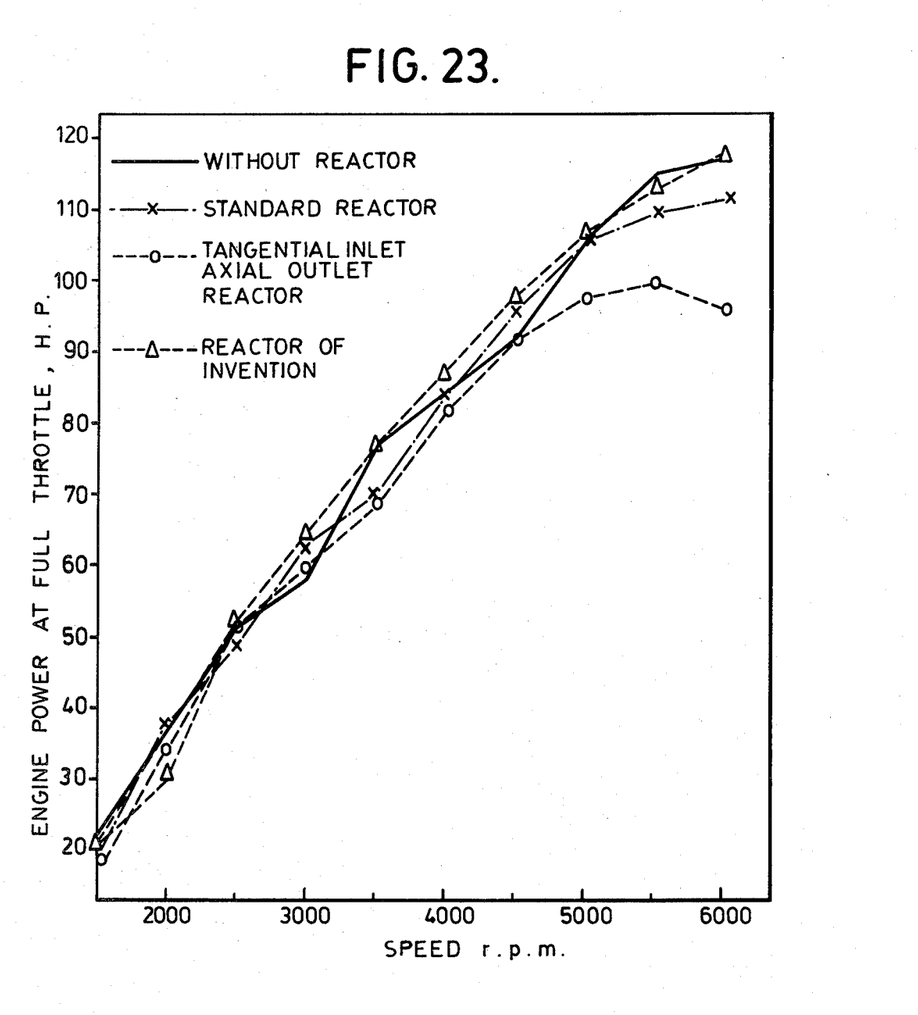
FIG. 23 shows comparitive performance data for an engine without, and with, different thermal reactors.

The curves of FIG. 23 show the benefits in engine performance of the reactor of the invention. The standard reactor referred to in FIG. 23 consists of a cylindrical chamber into one axial end of which a mixture of air and exhaust gas is passed, and out of the other axial end of which the treated exhaust gas is discharged. The tangential inlet/axial outlet reactor has a similar arrangement of tangential inlet to the reactor of the present invention, but has an axial outlet for treated gas. It is clear that this arrangement is considerably disadvantageous compared to the tangential outlet arrangement of the present invention. The performance of the engine with the reactor of the invention is superior to the performance of the engine with other reactors, and tends to be slightly better than the performance of the engine without a reactor.

We claim:

1. A reactor for treating exhaust gas from an internal combustion engine, comprising a lateral wall defining a single substantially axially unobstructed hollow cylindrical combustion chamber of circular cross-section and substantially circular end walls defining the opposite ends of the chamber, said chamber having an inlet zone adjacent one endwall and an outlet zone adjacent the other end wall, at least one inlet aperture in the lateral wall adjacent to said one end wall and inlet pipe means joined to the lateral wall for directing exhaust gas through the inlet aperture into the chamber substantially tangentially with respect to the lateral wall and causing exhaust gas to circulate in a vortex substantially parallel to the lateral wall, an outlet aperture in the lateral wall adjacent to said other end wall, and an outlet pipe joined to the lateral wall and arranged for receiving gases substantially tangentially from the chamber via the outlet aperture, the ratio of the width of the inlet aperture and pipe means, in a cross-sectional plane which is perpendicular to the axis of said reactor to the diameter of said reactor, in the inlet zone being in the range of substantially 1:2 and the ratio of the width of the outlet aperture and outlet pipe, in a cross-sectional plane perpendicular to the axis of said reactor, to the diameter of said reactor in the outlet zone being in the range of substantially 1:2, and the ratio of axial length to internal diameter of said chamber being in the range of from 1:1 to 4:1.

* * * * *